(12) United States Patent
Krause et al.

(10) Patent No.: US 8,580,115 B2
(45) Date of Patent: Nov. 12, 2013

(54) METHOD FOR CLEANING FILTRATION MEMBRANE MODULES AND MEMBRANE BIOREACTOR SYSTEM FOR TREATING UNTREATED WATER OR WASTEWATER OR ACTIVATED SLUDGE

(75) Inventors: Stefan Krause, Darmstadt (DE); Reinhard Voigt, Gotha (DE); Peter Cornel, Oberursel (DE)

(73) Assignee: Microdyn-Nadir GmbH, Wiesbaden (DE)

( * ) Notice: Subject to any disclaimer, the term of this patent is extended or adjusted under 35 U.S.C. 154(b) by 533 days.

(21) Appl. No.: 12/988,667

(22) PCT Filed: Apr. 23, 2009

(86) PCT No.: PCT/EP2009/002944
§ 371 (c)(1),
(2), (4) Date: Oct. 20, 2010

(87) PCT Pub. No.: WO2009/132797
PCT Pub. Date: Nov. 5, 2009

(65) Prior Publication Data
US 2011/0042308 A1    Feb. 24, 2011

(30) Foreign Application Priority Data
Apr. 29, 2008 (DE) .......................... 10 2008 021 190

(51) Int. Cl.
*C02F 9/00* (2006.01)

(52) U.S. Cl.
USPC ........... 210/631; 210/791; 210/797; 210/150; 210/151; 210/220; 210/353

(58) Field of Classification Search
USPC .......... 210/631, 791, 797, 150–151, 220, 353
See application file for complete search history.

(56) References Cited

FOREIGN PATENT DOCUMENTS

| | | | |
|---|---|---|---|
| DE | 199 53 459 | A1 | 5/2001 |
| DE | 102 20 916 | A1 | 11/2003 |
| EP | 1 734 011 | A1 | 12/2006 |
| EP | 1 852 175 | A1 | 11/2007 |
| JP | 09 136021 | A2 | 5/1997 |
| JP | 11 197685 | A1 | 7/1999 |
| JP | 05 074357 | A1 | 3/2005 |

OTHER PUBLICATIONS

F. Klegraf, "Control of Fouling and Scale Build-up in Submerged Filtration Systems and Activated Sludge Membrane Units" VA Tech Wabag GmbH.

*Primary Examiner* — Chester Barry
(74) *Attorney, Agent, or Firm* — ProPat, L.L.C.

(57) ABSTRACT

A method of cleaning filtration modules for the treatment of raw water, or wastewater, or activated sludge, is provided by circulating particles in untreated water. The deposits located on the filter membrane outer surfaces are removed by the mechanical action of the particles, without significantly damaging the membrane. Initially, untreated water, wastewater, or activated sludge is chemically-mechanically pretreated. Then the untreated water or wastewater polluted with biologically active material is discharged into a membrane bioreactor system having a filtration unit including at least one filtration tank. At least one submerged filtration membrane module is present in the filtration tank. The untreated water or wastewater in this filtration tank is filled with particles and circulates inside the filtration tank. The particles are non-porous, biologically resistant polymer particles. Alternatively, a cleaning tank including a circulating fluid containing particles may be provided for the temporary accommodation of the filtration module.

29 Claims, 5 Drawing Sheets

METHOD FOR CLEANING FILTRATION MEMBRANE MODULES AND MEMBRANE BIOREACTOR SYSTEM FOR TREATING UNTREATED WATER OR WASTEWATER OR ACTIVATED SLUDGE

CROSS-REFERENCE TO RELATED APPLICATIONS

This application is being filed under Rule 1.371 as a National Stage Application of pending International Application No. PCT/EP2009/002944 filed Apr. 23, 2009, which claims priority to parent application German Patent Application No. 10 2008 021 190.7, filed Apr. 29, 2008. Both International Application No. PCT/EP2009/002944 and German Patent Application No. 10 2008 021 190.7 are hereby incorporated by reference herein in their entirety.

FIELD OF THE INVENTION

The invention relates to a method for cleaning filtration membrane modules which are used for treating raw water or wastewater or activated sludge.

BACKGROUND OF THE INVENTION

The use of membrane bioreactors (MBR) and filtration membrane modules for treating raw water or wastewater is known in principle. The membranes used for filtration consist, for example, of polymeric materials such as polyethylene, polypropylene, polyethersulfone, polyvinylidene fluoride or similar polymers. The pore sizes of the membranes are for these uses in the range between 0.001 and 1 µm. In a membrane bioreactor, the activation method for wastewater treatment with separation of the biomass from the purified water is carried out using ultra- or microfiltration membranes. In most applications, the polymer membranes are immersed directly in the activated sludge and the treated wastewater is drawn off by means of vacuum suction or flows off under the influence of gravity.

In the MBR method, the wastewater is physically, chemically and biologically treated in a plurality of steps until it reaches the membrane. By means of mechanical and physical pretreatments, the wastewater is freed from particles, fibers and coarse matter. In the coarse filtration, large particles which could cause damage to the membranes are removed by grills and screens. In the MBR method, fine screens in a size range of 0.05-3 mm are customarily used as prefiltration. The wastewater is in addition freed from heavy particles (e.g. sand) and oils and fats by a sand and fat trap.

In a further treatment step of the wastewater treatment, the wastewater is biologically and chemically treated. In the activation tank there is situated the activated sludge (biomass) which contains in its biomass the enzymatic potential for conversion of the high-molecular-weight pollutants in such a manner that these can be eliminated. The dissolved materials are utilized by the biomass either for the cell structure or for energy production with oxygen consumption. The resultant oxygen consumption must be covered by sufficient oxygen supply, for which reason activation tanks are provided with aeration appliances. A precondition for the functioning of the method is that the biomass remains in the system. Therefore, the biomass is separated off from the purified wastewater by membrane filtration and recirculated to the activation tank. Overgrown activated sludge is removed as excess sludge. Before the biomass is separated from the water, further chemical treatments proceed. In combination with a filtration stage, various precipitants and flocculants such as, for example, iron chloride or polymers for removing colloidally and particulately dispersed liquid components are customarily used.

A substantial advantage of MBR systems is the solids-free effluent. This means, in addition, that no bacteria are found in the effluent of the membrane activation system and, even viruses may be separated off by sorption effects. The residual organic pollution is reduced thereby owing to the complete separation. The hygienically relevant guide values of the EU bathing water directive [75/160/EEC, 1975] are complied with using MBR. In addition, the solids-free effluent offers not only in the municipal sector but also in the industrial sector, a great potential for wastewater reuse. Here, by water recycling up to closed circulation of water large savings of water can be achieved. A further advantage is that in this method, owing to the adjustable high DM content and the omission of the clarifiers, only a very small space is required. Owing to the independence of the sedimentation behavior, the activated sludge concentration (biomass concentration, expressed as DM—dry matter) can be increased over conventional methods. Membrane bioreactors are customarily operated at DM concentrations of 8 to 15 g/l. Compared with the conventional activation method, the reactor volume of a membrane bioreactor can be reduced, in such a manner that higher volumetric loadings are possible.

In the case of the membrane bioreactor method which is based generally on the aerobic activation method that is combined with a membrane filtration unit, the biomass is recirculated as concentrate over the membrane filtration unit, while the purified water is separated off as filtration permeate.

A problem in the use of membrane filters in the field of wastewater purification is what is termed "membrane fouling", which means that deposits form on the membranes, which deposits decrease the through-flow of the liquid that is to be purified.

DE 102 20 916 A1 describes a filtration appliance and also a membrane bioreactor which are operated under conditions in the filtration medium such that membrane fouling and deposits on the membrane surfaces are reduced. For this purpose the filtration device has hollow fiber membranes that are combined to form a fiber bundle for separating off the particles from a liquid, through which hollow fiber membranes liquid flows from the outside to the inside, and the filtered liquid is then taken off from at least one of the ends of the hollow fiber membranes. The filtration device, in addition, has a gas feed device in order to flush a gas over the exterior of the hollow fiber membranes. The fiber bundle in this case is wound round the outer peripheral surface of a carrier of the gas feed device.

EP 1 734 011 A1 (whose United States equivalent is United States Patent Publication No. 2006/272198A1) discloses a method for improving the flow through a membrane bioreactor, in which a certain fraction of cationic, amphoteric and zwitterionic polymers or a combination thereof is added. The fraction of the added polymers is 10 to 2000 ppm, based on the entire membrane bioreactor volume. The polymers have a molecular weight of 10 000 to 20 000 000 Da. Adding the abovementioned polymer should reduce, especially inorganic fouling, which is formed by the precipitation of limestone $CaCO_3$ onto the membrane surfaces from the wastewater that is to be purified. The pH increases in the course of this, whereby in turn the precipitation is promoted by calcium phosphate and iron oxide. The precipitation of carbonates and phosphates in the wastewater proceeds in the form of small particles which are retained on the membrane surfaces.

Quite generally it is true that membrane fouling due to the precipitation of bioactive solids, colloids, accumulation of particles or macromolecular particles on the membrane surface leads to a decrease in the through-flow and permeability. It is difficult to describe the fouling process exactly owing to the heterogeneity of the activated sludge. Factors such as characteristics of the biomass, the extracellular polymeric substance, pore size, surface characteristics and membrane material, and also the construction of the filter membrane modules and the operating conditions influence fouling growth. For example, biofouling occurs most frequently on nanofiltration and reverse osmosis. The reason is that the membranes cannot be disinfected with chlorine in order to kill bacteria. The biofouling is principally due to the complex growth behavior of the bacteria. The type of microorganisms, the growth rate thereof and concentration on the membranes depend chiefly on the critical factors such as temperature, pH, the concentration of dissolved oxygen and the presence of organic and inorganic nutrients. It should be noted that the microorganisms pass into the filtration systems via air and/or water.

In the case of the filtration methods using membrane bioreactors, the growth of the fouling is customarily monitored in a plurality of steps.

1. Pretreatment of the raw water or wastewater, before inflow into the activated sludge, by means of various filtration steps as have already been mentioned above, for which purpose fine-mesh gratings having a mesh width of 0.5 to 3 mm are used.

2. In the "crossflow" method, the liquid that is to be purified is circulated along the membrane surface, for which purpose in the case of submerged modules, aeration devices are installed below the membrane modules, which aeration devices induce an upward streaming.

3. In some membrane modules a regular fully automatic backwash with permeate is performed, in such a manner that adhering particles/dirt are detached from the membrane surface and the pores are flushed open. A precondition is that the respective membrane is backwashable.

4. Chemical cleaning: the steps serve to prevent membrane fouling or at least decrease it. Chemical cleaning is necessary in order to remove the membrane fouling layers on and within the membranes. Chemical cleaning gives rise to considerable operating costs, since during the cleaning the membranes are out of operation and therefore additional membranes must be installed.

In addition, it is disadvantageous that the chemicals used such as, for example, sodium hydrochlorite NaOCl adversely affect the environment and contribute to the formation of absorbable organic halogen compounds (AOX). In addition, chemical cleaning requires an additional infrastructure (pumps, chemical containers, leak measuring devices, protective equipment, . . . ) which is costly. Frequently, the membranes are chemically cleaned in a separate cleaning container in order to save chemicals, since these cleaning containers have small volumes. For this purpose the membrane module must be taken out of the filtration pond or tank and installed in the cleaning pond or tank. In the cleaning pond/tank, the chemical cleaning then takes place. The operating personnel must be trained to handle these chemicals and chemical cleaning is labor-intensive. Overall, chemical cleaning is a considerable cost and environmental factor.

For avoiding fouling layers, the publication of the company VA TECH WABAG GmbH, Vienna, editor: F. Klegraf with the title "Beherrschung von Fouling und Scaling an getauchten Filtrationssystemen in Membranbelebungs-anlagen" [Managing fouling and scaling on submerged filtration systems in membrane activation systems] describes the use of abrasively acting inert inorganic porous materials which can detach deposits on the surface of the membranes by long-term action. This use is not uncontroversial, since it must be feared that the abrasive forces not only erode the deposits, but also damage the sensitive surfaces of the membranes. As inert abrasive material, expanded clay is mentioned which is introduced into the reactor. The expanded clay is retained in the reactor by screens. The turbulence introduced into the reactor with the flushing air is sufficient to homogenize the expanded clay in the system. Immediately after charging the reactor with expanded clay, the increase in filtration performance can be measured and by careful increasing of the expanded clay concentration in the activated sludge, 75% of the preset value of the filtration performance can be achieved after an experimental time of 40 days. Further increase of the expanded clay concentration in the reactor is not accompanied by any lasting improvement of the filtration results. The density of the porous expanded clay increases with time owing to water absorption. The expanded clay particles become heavier thereby and settle within the reactor and circulate only to a small extent as a result of the liquid streaming. In order to stimulate the circulation of the expanded clay particles, relatively large amounts of compressed air are then necessary but owing to the increased feed of compressed air into the liquids that are to be purified, other process parameters can be adversely affected thereby, for example maintaining preset theoretical oxygen values is made considerably more difficult. The velocity of ascension of the particles here is predetermined by the size of the air bubbles formed, but not by the amount of air introduced.

SUMMARY OF ADVANTAGEOUS EMBODIMENTS OF THE INVENTION

It is an object of the invention to provide conditions for a method for cleaning filtration membrane modules that are used in the treatment of crude water or waste-water or activated sludge in which the deposits caused by the membrane fouling are very greatly reduced and mechanical damage to the membranes is substantially avoided. In the context of this object, the operating costs must also be reduced and flow of the wastewaters that are to be purified through the membranes must be kept constant for a relatively long time.

This object is achieved according to the invention in that the filtration membrane module that is to be cleaned is introduced into a cleaning pond/tank or arranged in a filtration pond/tank, flushed by a liquid which contains non-porous biologically resistant particles and set in circulation with gas introduction and in that the deposit situated on outer surfaces of the membranes of the filtration membrane module, termed membrane fouling, is mechanically eroded by the particles.

DETAILED DESCRIPTION OF ADVANTAGEOUS EMBODIMENTS OF THE INVENTION

The method for treating raw water or wastewater or activated sludge comprises the steps:
- mechanical, physical and chemical pretreatment of the raw water or wastewater or activated sludge,
- introducing the raw water or wastewater contaminated with biologically active material into a membrane bioreactor system having one or more filtration tanks in which in each case at least one submerged filtration membrane module is arranged,
- charging the raw water or wastewater or the activated sludge in the filtration tank with particles circulating in the filtration tank,
- taking off the water purified by the biologically active material,
- as a special case in applications in which a separate cleaning container is installed: installation of at least one membrane module in the cleaning container, charging the cleaning container with circulating particles.

In an embodiment of the method, the particles that circulate within the filtration tank perform an upward movement induced by gas introduction, in particular by compressed air, and perform a downward movement effected by gravity. Expediently, the non-porous particles consist of inert polymeric material that has a density of 1.0 to 1.5 kg/dm$^3$. The term "inert" is used here and hereinafter synonymously with "biologically resistant" or not degradable by the bacteria in the activated sludge.

The polymeric material is advantageously selected from the group consisting of polypropylene, mineral particle-containing, polycarbonate blends, thermoplastic polyurethane elastomers, poly(methyl methacrylate), poly(butylene terephthalate), polyoxymethylene, polyethylene, poly(vinyl chloride). In particular, the particles have a median diameter of less than 5 mm and have a spherical, cylindrical or lenticular shape.

In order to avoid damage of the sensitive filtration membranes by the particles that are introduced, the roughness of the particles must not exceed a defined measure. According to the invention, particles are used, the surface of which has a median roughness Rtm of less than 40μ, preferably less than 30 μm, and in particular less than 20 μm. The median roughness Rtm is determined by taking the median of the roughnesses Rt (DIN EN ISO 4287) of a plurality of particles.

For treating raw water or wastewater or activated sludge, a membrane bioreactor system having a filtration pond/tank having at least one submerged filtration membrane module is provided. In this case the system is distinguished in that the raw water or wastewater or the activated sludge in the filtration tank contains non-porous, biologically resistant particles.

In an embodiment of the membrane bioreactor, the spacing between two membranes in the filtration membrane module is up to 8 mm and the median diameter of the particles (granules) is less than 5 mm. Advantageously, a feed device for gas, in particular compressed air, is provided for the bottom end of the filtration membrane module, the compressed air streaming of which moves the particles upward between the membranes. The maximum specific area loading of the membranes in the filtration membrane module is 1 to 80 l/(m$^2$×h). It has been found that the permeability as a ratio of the specific area loading of the membrane to the transmembrane pressure in the filtration membrane modules is constant over an operating time of more than 6 months.

The method achieves the advantages that mechanical erosion of the membrane fouling layers proceeds without additional chemical cleaning, that the flow of the liquid that is to be purified through the membranes remains constant over a time period of several months, abrasive damage to the membrane surfaces by particles occurs only to a very slight extent and the operating costs can thereby be reduced, since the intervals for cleaning the membrane surfaces can be extended.

Also, by means of the method, membranes which already have a fouling layer, characterized by a very low permeability and high transmembrane pressures, can be regenerated again by addition of granules. For this purpose the membrane module is installed in a cleaning container and particles that are set in motion are added to the liquid in the cleaning container. The membranes are cleaned within the cleaning container by the particles. The particles can remain in the cleaning tank and be reused, which gives further cost savings. The cleaned membrane modules can then again be installed for the filtration operation.

Figure 1:
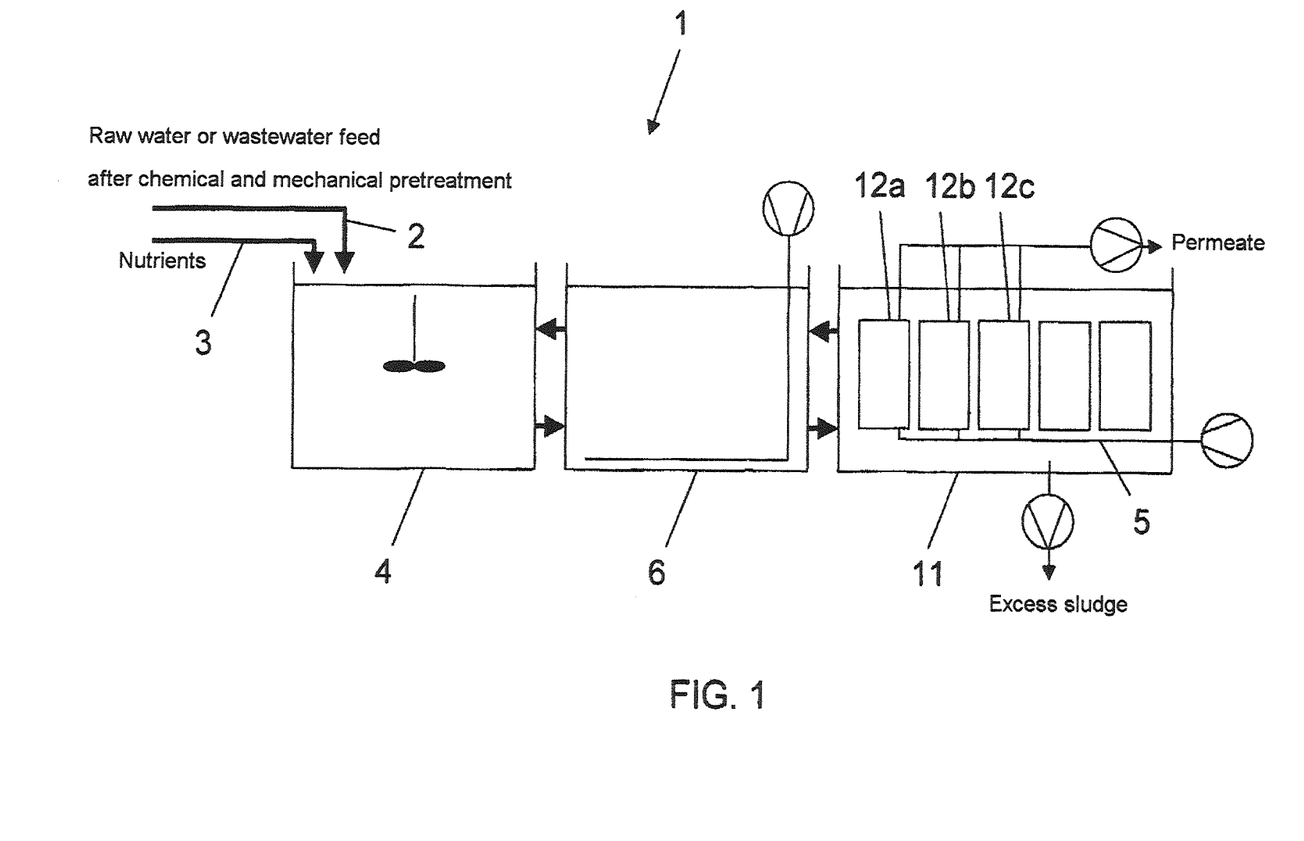
FIG. 1 is a schematic illustration of an exemplary membrane bioreactor system having a filtration appliance.
Figure 2:
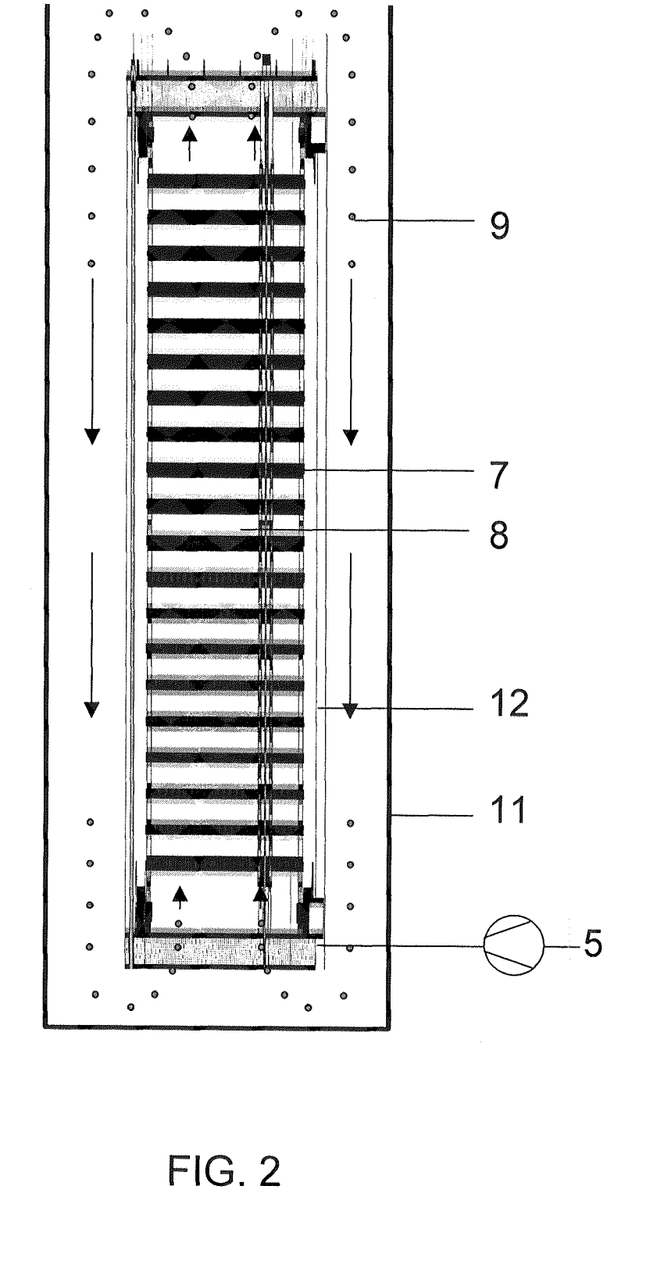
FIG. 2 illustrates a cross-section through an exemplary filtration tank and a filtration membrane module.
Figure 3:
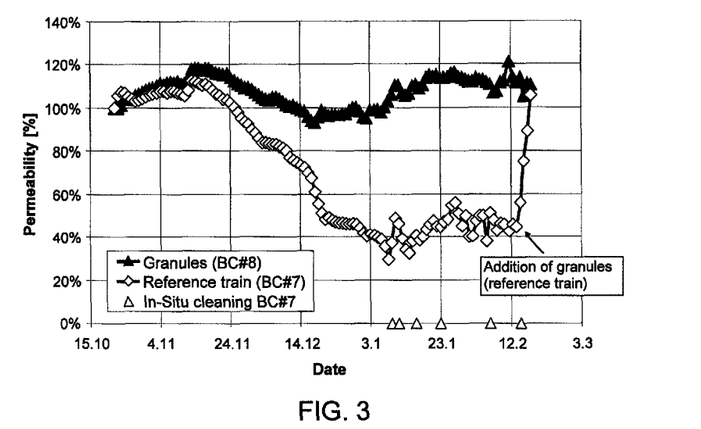
FIG. 3 graphically illustrates the permeabilities of various filtration membrane modules over time.
Figure 4:
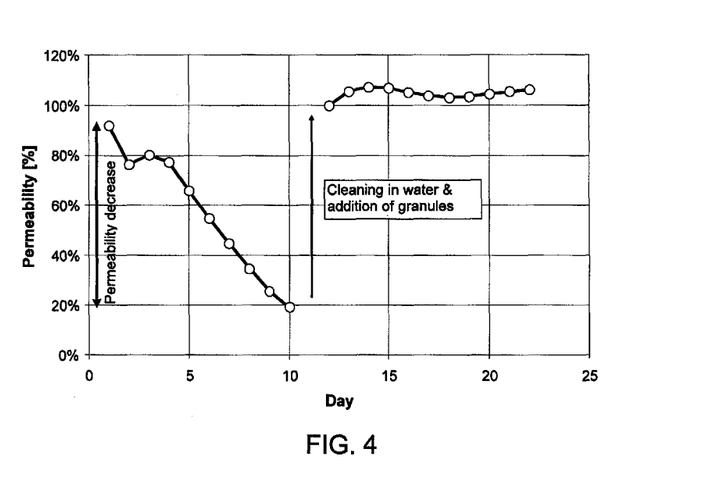
FIG. 4 graphically illustrates the decrease in permeability of a filtration membrane module and the increase permeability after cleaning in accordance with the invention.
Figure 5:
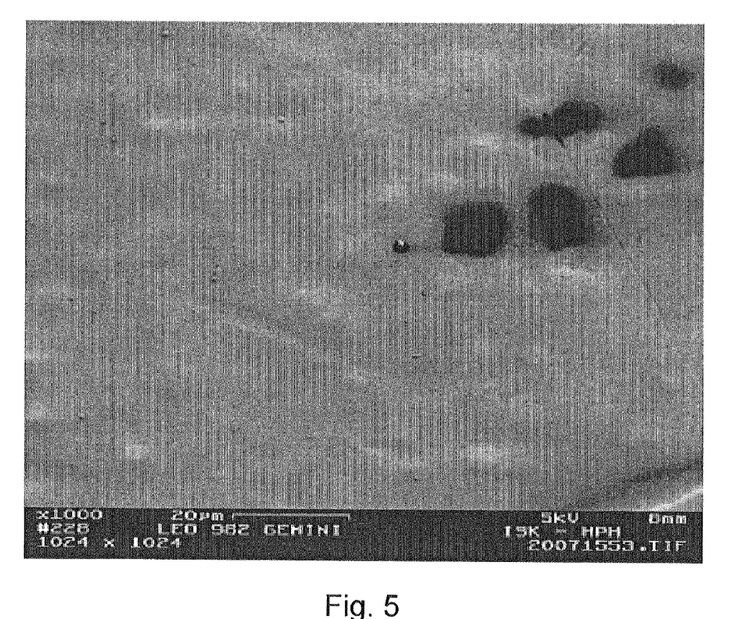
FIG. 5 is an electron micrograph of a membrane surface before insertion of the membrane into the filtration membrane module.
Figure 6:
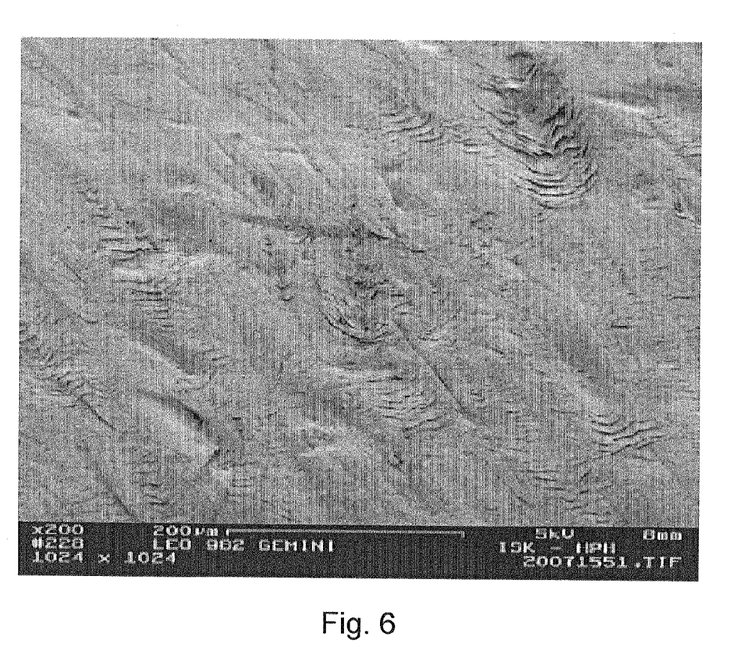
FIG. 6 is an electron micrograph of a membrane surface, the fouling layer of which was eroded by means of thermoplastic polyurethane particles.
Figure 7:
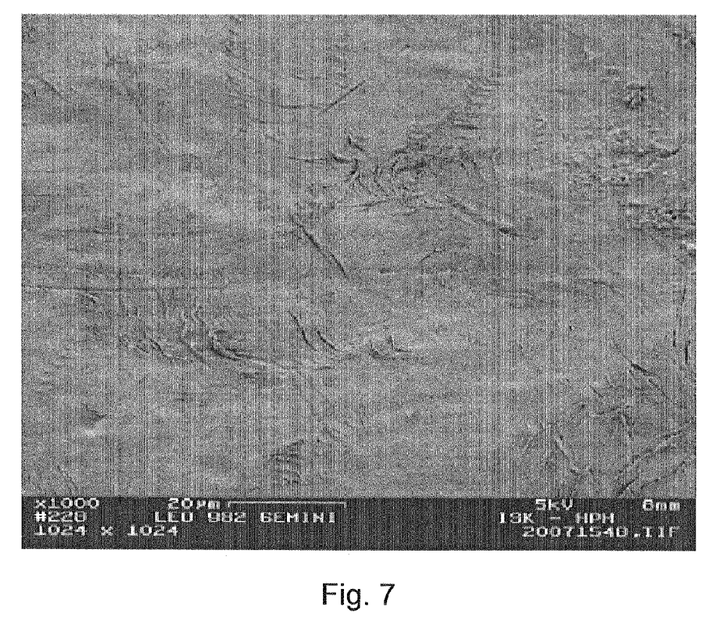
FIG. 7 is an electron micrograph of a membrane surface, the fouling layer of which was eroded by means of poly (methyl methacrylate) particles.
Figure 8:
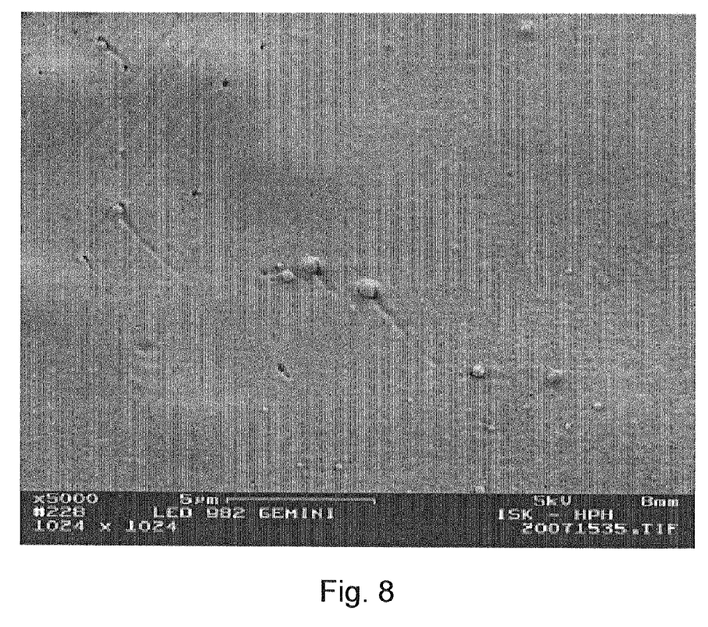
FIG. 8 is an electron micrograph of a membrane surface, the fouling layer of which was removed without the interaction of particles.

The invention will be described in more detail hereinafter with reference to the drawings. In the drawings:

FIG. 1 shows a schematic depiction of a membrane bioreactor system having a filtration appliance, FIG. 2 shows a section through a filtration tank and a filtration membrane module, FIG. 3 shows a diagram of the permeability of the membranes of a filtration membrane module over time, FIG. 4 shows a diagram of the decrease in permeability of a filtration membrane module and the permeability after cleaning, FIG. 5 shows an electron micrograph of a membrane surface before insertion of the membrane into the filtration membrane module, FIG. 6 shows an electron micrograph of a membrane surface, the fouling layer of which was eroded by means of thermoplastic polyurethane particles, FIG. 7 shows an electron micrograph of a membrane surface, the fouling layer of which was eroded by means of poly(methyl methacrylate) particles, and FIG. 8 shows an electron micrograph of a membrane surface, the fouling layer of which was removed without the interaction of particles.

FIG. 1 shows schematically a membrane bioreactor system 1 for treating raw water or wastewater, a denitrification appliance 4, a nitrification appliance and a filtration tank 11 in which a plurality of filtration membrane modules 12*a*, 12*b*, 12*c* . . . are situated. In the denitrification appliance 4, via a feed line 2, raw water or wastewater is introduced after it was previously chemically and mechanically pretreated. In addition, via a line 3, nutrients pass into the activation stage. In the filtration tank 11 are arranged, for example, five filtration membrane modules, of which three filtration membrane modules 12*a*, 12*b*, and 12*c* are in operation which will be explained in more detail hereinafter. These three filtration membrane modules are exposed to compressed air via a feed device 5 for gas, in particular for compressed air, at the bottom end of the respective filtration membrane modules.

Via a pump, the excess sludge is transported out of the filtration tank 11. The top ends of the filtration membrane modules are connected to a return line for the raw water or waste-water. In addition, the water that is purified by the biologically active material is taken off from the filtration tank by means of a pump in the permeate line.

FIG. 2 shows schematically a section through a filtration tank 11 that contains a filtration membrane module 12. The spacing between two membranes 7 and 8 that are adjacent in a filtration membrane module 12 is up to 8 mm. Non-porous, resistant particles 9 which are present as granules are introduced into the raw water or wastewater within the single filtration tank 11. The feed device 5 for gas, in particular compressed air, is situated at the bottom end of the filtration membrane module 12. The gas or air bubbles ascending from the feed device 5 flow up between the membranes of the filtration membrane module 12 and carry with them the particles 9, the density of which is 1.0 to 1.5 kg/dm$^3$. After the particles flow through the entire height of the filtration membrane modules 12, the particles 9 fall down outside the filtration membrane module 12 owing to gravity. In this manner circulation of the particles 9 is achieved which, during the upward flow, mechanically erode membrane fouling layers that are developing on the membrane surfaces, wherein abrasive damage to the membrane surfaces is virtually entirely avoided.

The non-porous particles 9 consist of inert polymeric material and have, as has already been mentioned, a density from 1.0 to 1.5 kg/dm$^3$. Preferably, the density of the polymeric material is 1.00 to 1.40 kg/dm$^3$, and in particular the density of the polymeric material has a value from 1.00 to 1.10 kg/dm$^3$. The polymeric material is selected from a group which consists of polypropylene that contains mineral particles, polycarbonate blends, thermoplastic polyurethane elastomers, poly(methyl methacrylate), poly(butylene terephthalate), polyoxymethylene, polyethylene, poly(vinyl chloride). The criteria for selection of the particles are compiled hereinafter in table 1.

Each of the filtration membrane modules 12 (a, b, c . . . ) shown in FIG. 1 is, as soon as its permeability decreases considerably, taken out of the filtration tank and introduced for cleaning into a cleaning tank which is constructed in a similar manner to the filtration tank. In the cleaning tank there is situated a liquid, preferably pure water, which contains non-porous, biologically resistant particles of the same properties as the particles in the filtration tank. The liquid is set in circulation with introduction of gas, in particular injection of air, in such a manner that the particles mechanically erode the deposit, termed membrane fouling, that is situated on the outer surfaces of the membranes of the filtration membrane module.

TABLE 1

Criteria for particle (granules) selection

| | |
|---|---|
| Density | 1-1.5 kg/dm$^3$, the particles circulate by their upward movement being effected by air bubbles in combination with the liquid streaming and their downward movement being effected by gravity. |
| Diameter | <5 mm, such that the passage between two adjacent membranes is possible without problems |
| Shape | Spherical, lenticular, cylindrical, low roughness |
| Material | Non-porous, biologically resistant, inert |

Preferably, the polymeric material of the particles 9 is polypropylene (PP) filled with minerals (PPTV20).

The particles 9 have a medium diameter of less than 5 mm, in particular from 1.5 to 3.5 mm. The median diameter of polypropylene (PP) filled with minerals (PPTV20) is in the range from 2.0 to 3.0 mm.

The particles 9 are produced from the respective polymeric material by means of known granule methods. For example, a powder of the polymer or copolymer in question that is optionally mixed with fillers is liquefied and sprayed through a nozzle into a precipitation bath. In this case substantially spherical, lenticular or cylindrical polymer particles are generated, into which fillers are optionally embedded. The polymer particles 9 generated are then screened and dried. The size and surface properties of the particles are adjustable in wide ranges via the diameter of the nozzle openings, the pressure, the composition of the precipitation bath and the process temperature.

According to the invention, the particles 9 have a surface that has a median roughness Rtm of less than 40μ, preferably less than 30 μm, and in particular less than 20 μm.

The median roughness Rtm of the particles 9 is determined as specified in DIN EN ISO 4287. For carrying out the measurement, first from at least 12 of the particles 9, a half-side impression is made by means of a molding compound. As molding or impression compound, a precision silicone-based casting material, e.g., high-viscosity condensation-crosslinked polysiloxane as specified in DIN 13 913 A2, ISO 4823 or Elastosil M1470 (Wacker-Chemie GmbH) is used. After the casting compound is cured, on the half-side concave impressions of the particles 9, a primary profile is recorded using a surface profiler (e.g. Hommel Tester T 4000) as specified in DIN EN ISO 3274. In order to obtain a measured section as long as possible, the measuring tip of the surface profiler is placed as centrally as possible by the respective impression of a particle 9. The spherical, lenticular or cylindrical surface contour and any long-wavelength surface structure present of the particles 9 or of the corresponding impressions in the casting compound is removed from the measured primary profile by software-supported filtering as specified in DIN EN ISO 11562 in order to obtain a roughness profile and its total height Rt (maximum height between the highest peak and the lowest valley). The median roughness Rtm is then determined as the median value of the roughnesses Rt of the at least 12 cast particles.

In table 2 hereinafter, the diameters and density of selected particles are compiled for pure water tests.

TABLE 2

Selected particles for pure water tests

| Material | Type name | Diameter [mm] | Density [kg/dm$^3$] |
|---|---|---|---|
| Polypropylene, mineral particle-containing | PPTV20 | 2.5 | 1.05 |
| Polycarbonate blends | PC | 1.5 | 1.10 |
| Thermoplastic polyurethane elastomer | TPU1185A | 3.0 | 1.12 |
| Poly(methyl methacrylate) | PMMA | 2.5-3.0 | 1.18 |
| Thermoplastic polyurethane elastomer | TPU1174D | 3.5 | 1.20 |
| Poly(butylene terephthalate) | PBT | 2.5 | 1.31 |
| Polyoxymethylene | POM Copo | 3.0 | 1.41 |

Using the particles listed in table 2, tests were carried out in advance in pure water in the preliminary studies for the present invention in order to be able to determine the best circulation properties of the particles. It was found here that mineral-filled polypropylene (PP) (PPTV20), the thermoplastic polyurethane elastomer TPO1174D and poly(methyl methacrylate) PMMA circulated well in the pure water. In the studies described hereinafter, therefore, preference was given to use of these particles for use for raw water or wastewater treatment. Per 1 m³ of filtration tank volume, particles 9 at a concentration of 1 to 5 kg/m³ were added to the raw water or wastewater volume to be purified. In practice, the activated sludge concentration DM is up to 20 g/l.

The membrane bioreactor system 1 shown schematically in FIG. 1 was operated at approximately 25° C. with synthetic wastewater. The pilot plant was operated for a plurality of months using the abovementioned three filtration tanks arranged in parallel with the modules 12a, 12b and 12c. During the operation, the effluent water quality with respect to turbidity and COD concentration, the operating conditions with regard to the solids fraction of the activated sludge, the activated sludge concentration DM, temperature, pH and membrane conditions such as through-flow, transmembrane pressure TMP, and permeability were recorded.

The resultant sludge loading is 0.1 kg of COD/kg of DM/d. The activated sludge concentration is up to 15 g/l.

The chemical oxygen demand COD is a measure of the total of all oxidizable substances present in the water under certain conditions. It indicates the amount of oxygen in mg/l which would be required for oxidation thereof if oxygen were the oxidizing agent. For determining the chemical oxygen demand, a water sample is strongly acidified with sulfuric acid and heated with a predetermined exact amount of the strong oxidizing agent potassium dichromate, with addition of silver sulfate as catalyst. The amount of dichromate consumed is calculated via determination of the remaining dichromate and therefrom the equivalent amount of oxygen $O_2$ is calculated.

In the case of chloride-containing samples, the chloride must be removed in advance or masked with mercury sulfate in order that the oxidation to chlorine does not erroneously increase the measured value.

The remaining amount of dichromate is determined by the German uniform method ditremetically using ammonium iron(II) sulfate solution and ferroin indicator.

In the monitoring of the chemical oxygen demand in sewage treatment plants and other water treatment plants, the COD is determined usually by means of what are termed cuvette rapid tests. These test kits already contain all of the necessary reagents and require little laboratory apparatus. The dichromate consumption—in contrast to in the German uniform methods—is determined photometrically and the associated special photometer shows the result also at the same time converted as oxygen in mg/l.

The chemical oxygen demand serves in particular as a summation parameter for quantifying the loading of wastewater with organic material. It determines both biodegradable and also non-biodegradable organic matter, but also some inorganic matter.

In order to obtain an indicator for the biological system such as, e.g., reduction of the chemical oxygen demand (COD) and for detecting interference, for example turbidity, the effluent water quality was studied continuously. On any working day, the chemical oxygen demand COD of the effluent water was determined, wherein the mean COD reduction was between 91.5% and a maximum of 99.6% of the original chemical oxygen demand of 550 to 650 mg/l. The reduction of the median chemical oxygen demand COD was 97% of the original oxygen demand. The turbidity of the effluent (permeate) shows the same level as mains water and during the entire operating time, no interferences of turbidity were recorded, which is an indication of a constant high removal of solid particles. The pilot plant was operated with synthetic water with a long sludge residence time of more than 50 days. The hydraulic residence time was less than 10 hours. High rates of recirculation to the filtration tanks were set. Flocculation and activated sludge volume index of the activated sludge were low. Since the filtration efficiencies in part also depend on the structure of the activated sludge, the filterability of the sludge used was low.

The through-flow and transmembrane pressure were continuously recorded and the permeability, that is the through-flow divided by the transmembrane pressure, was calculated and used as an indicator of the current membrane state and the situation with respect to membrane fouling.

FIG. 3 shows the permeability of all filtration membrane modules over time. All modules began with a permeability in the range from 400 to 500 $l/(m^2 \times h \times bar)$ (initial permeability=100%). It may clearly be seen that the permeability remains constant over a period of several months in the filtration membrane modules 12a and 12b with PP granules. The permeability in the filtration membrane modules 12c (reference train) during the experimental phase reduced in the course of 2.5 months to about 40% of the initial permeability. By means of weekly in-situ cleaning, the permeability could readily be increased to about 50% of its initial permeability.

By adding about 0.5 to 1.0 kg/m³ of granules in the reference train, the cleaning action of the granules could be demonstrated. In the course of four days, the permeability increased to its initial state (FIG. 3).

Comparison of the filter tanks operated in different manners showed that the permeability of the membranes in the reference train fell much more greatly than in the filter tanks operated with particles and that therefore in the reference train chemical cleaning was necessary.

FIG. 4 shows the result of a cleaning. Cleaning of membranes already bearing a fouling layer is possible. A filtration membrane module that had a permeability of only 20% of its initial permeability was treated with air in a cleaning tank with water and an addition of 1 to 10 kg/m³, in particular about 3 to 5 kg/m³, of granules over about 10 to 14 hours in such a manner that the particles circulated. After completion of cleaning, the module was again put in operation and exhibited its initial permeability.

It was found that in the method for treating raw water or wastewater by using particles in the filtration tanks, the control of the formation of membrane fouling layers is reinforced. Over the operating period, the permeability of the membranes remains substantially constant, whereas in the reference train which operates without granules the permeability decreases greatly. It was found that the beneficial effect of the particles used and the basic function of treating the raw water or wastewater which is to separate the biomass and purified water from one another is achieved. The costs of the chemical cleaning can be reduced by the method according to the invention. Likewise, the effect on the environment is less lasting, since fewer chemicals are liberated and therefore the potential for byproducts such as, for example, absorbable organic halogen compounds, is reduced.

FIG. 5 shows an electron micrograph of a fresh membrane material, for example a polyethersulfone membrane having a pore size of 0.05 μm. No surface defects of any kind may be recognized.

According to FIG. 6, the membranes of a filtration membrane module show small abrasive effects which may be recognized as physical damage of the membrane surface. The smaller the fouling layer of the membrane under examination is, the more physical defects can be recognized. This indicates that the particles influence the fouling layer.

It can be seen from FIG. 7 that the membranes of filtration membrane modules which are operated with differing granules display roughly the same phenomena. Overall, it may be recognized on the basis of the SEM images, that the membranes can continue to perform their function of separating the biomass from water.

FIG. 8 shows electron micrographs of membranes which were installed in the reference train, which were operated without particle circulation. These membranes do not indicate any physical damage and their membrane surfaces agree with the membrane surfaces of fresh membranes.

In summary, it may be stated that the use of non-porous particles for the most part prevents the formation of membrane fouling layers owing to mechanical erosion, and the permeability of the membranes is thereby kept constant over relatively long time periods. In the purified wastewater, on the basis of turbidity measurements it was established that neither sludge nor other particles are present in the effluent water. In addition, purification of already fouled membranes can be achieved by adding particles. The slight physical damage observed to the membranes by the particle does not impair the separation of the biomass from the purified water.

The invention claimed is:

1. A method for cleaning raw water or wastewater or activated sludge filtration membrane modules, comprising
    introducing the filtration membrane module to be cleaned into a cleaning tank or arranging the filtration membrane module in a filtration tank,
    flushing the filtration membrane module with a liquid containing non-porous biologically resistant particles that have been set in circulation by introducing gas,
    wherein deposits situated on outer surfaces of the membranes of the filtration membrane module are mechanically eroded by the particles, and
    the particles have a median surface roughness Rtm of less than 40 µm.

2. The method as claimed in claim 1, wherein the method further comprises treating raw water or wastewater or activated sludge, said treatment comprising the steps:
    mechanically, and chemically pretreating the raw water or wastewater or activated sludge,
    introducing the pretreated raw water or wastewater contaminated with biologically active material into a membrane bioreactor system having one or more filtration tanks, said filtration tank having at least one submerged filtration membrane module arranged therein,
    charging the raw water or wastewater or the activated sludge in the filtration tank with circulating particles and taking off the water purified by the biologically active material.

3. The method as claimed in claim 1, wherein the gas introduction induces an upward movement in the particles that circulate within the cleaning or filtration tank and gravity effects a downward movement in the particles that circulate within the cleaning or filtration tank.

4. The method as claimed in claim 1, wherein the non-porous particles consist of inert polymeric material having a density of 1.0 to 1.5 kg/dm$^3$.

5. The method as claimed in claim 4, wherein the density of the polymeric material is 1.0 to 1.1 kg/dm$^3$.

6. The method as claimed in claim 4, wherein the polymeric material is selected from the group consisting of mineral-filled polypropylene, polycarbonate blends, thermoplastic polyurethane elastomers, poly(methyl methacrylate), poly(butylene tereph(halate), polyoxymethylene, polyethylene, and poly(vinyl chloride).

7. The method as claimed in claim 6, wherein the polymeric material is mineral-filled polypropylene.

8. The method as claimed in claim 6, wherein the polymeric material is poly(methyl methacrylate).

9. The method as claimed in claim 1, wherein the particles have a median diameter of less than 5 mm.

10. The method as claimed in claim 9, wherein the particles have a median diameter in the range from 1.5 to 3.5 mm.

11. The method as claimed in claim 9, wherein the particles have a median diameter of from 2.5 to 3.5 mm.

12. The method as claimed in claim 1, wherein the particles have a spherical, cylindrical or lenticular shape.

13. The method as claimed in claim 2, wherein particles are added at a concentration from 1 to 5 kg per m$^3$ to raw water or wastewater that is to be purified or activated sludge volume in the filtration tank.

14. The method as claimed in claim 2, wherein the activated sludge concentration DM is up to 20 g/l.

15. The method as claimed in claim 1, wherein a maximum specific area loading of the membranes in the filtration membrane module is set in the range from 1 l/(m$^2$×h) to 80 l/(m$^2$×h).

16. A membrane bioreactor system for treating raw water or wastewater or activated sludge having a filtration tank in which at least one submerged filtration membrane module is situated in the filtration tank, wherein the raw water or wastewater or the activated sludge in the filtration tank contains non-porous, biologically resistant particles,
    and the particles have a median surface roughness Rtm of less than 40 µm.

17. The membrane bioreactor system as claimed in claim 16, wherein the filtration membrane module comprises membranes having a spacing between two membranes of up to 8 mm and a median diameter of the particles of less than 5 mm.

18. The membrane bioreactor system as claimed in claim 16, wherein the particles consist of a polymeric material having a density from 1.0 to 1.5 kg/dm$^3$ and the polymeric material is selected from the group consisting of mineral-filled polypropylene, polycarbonate blends, thermoplastic polyurethane elastomers, poly(methyl methacrylate), poly(butylene terephthalate), polyoxymethylene, polyethylene, and poly(vinyl chloride).

19. The membrane bioreactor system as claimed in claim 16, wherein a feed device for gas is provided for the bottom end of the filtration membrane module, and the gas streaming moves the particles upward between the membranes.

20. The membrane bioreactor system as claimed in claim 16, wherein the maximum specific area loading of the membranes in the filtration membrane module is 1 to 80 l/(m$^2$×h).

21. A membrane bioreactor system as claimed in claim 16, wherein said particles circulate at a concentration from 1 to 10 kg/m$^3$ in the filtration tank.

22. A membrane bioreactor system as claimed in claim 21, wherein said circulating particles are made of high-strength, low-abrasion, inert, non-porous polymeric materials.

23. A cleaning container for cleaning filtration membrane modules of membrane bioreactor systems, said cleaning container comprising particles consisting of inert polymeric material having a density of 1.0 to 1.5 kg/dm$^3$ circulating at a concentration of 1 to 10 kg/m$^3$ in water with air injection, said particles having a median surface roughness Rtm of less than 40 µm.

24. The method as claimed in claim 3, wherein the gas is compressed air.

25. The method as claimed in claim 1, wherein the particles have a median surface roughness Rtm of less than 30 μm.

26. The method as claimed in claim 25, wherein the particles have a median surface roughness Rtm of less than 20 μm.

27. The membrane bioreactor system as claimed in claim 16, wherein the particles have a median surface roughness Rtm of less than 30 μm.

28. The membrane bioreactor system as claimed in claim 27, wherein the particles have a median surface roughness Rtm of less than 20 μm.

29. A membrane bioreactor system for treating raw water or wastewater or activated sludge having a filtration tank in which at least one submerged filtration membrane module is situated in the filtration tank, wherein the raw water or wastewater or the activated sludge in the filtration tank contains non-porous, biologically resistant particles, a feed device for gas is provided for the bottom end of the filtration membrane module, the gas streaming moves the particles upward between the membranes, and the gas is compressed air.

* * * * *